United States Patent
Hihnala et al.

(12) 
(10) Patent No.: US 8,226,457 B2
(45) Date of Patent: Jul. 24, 2012

(54) PROCESS FOR PRODUCING A COMPOSITE FOOD CASING

(75) Inventors: Esa Hihnala, Lohja (FI); Roland Tallberg, Hango (FI)

(73) Assignee: ViskoTeepak Belgium NV, Lommel (BE)

(*) Notice: Subject to any disclaimer, the term of this patent is extended or adjusted under 35 U.S.C. 154(b) by 1000 days.

(21) Appl. No.: 12/223,187

(22) PCT Filed: Feb. 9, 2007

(86) PCT No.: PCT/FI2007/050072
§ 371 (c)(1),
(2), (4) Date: Aug. 28, 2008

(87) PCT Pub. No.: WO2007/090934
PCT Pub. Date: Aug. 16, 2007

(65) Prior Publication Data
US 2010/0255230 A1  Oct. 7, 2010

Related U.S. Application Data

(60) Provisional application No. 60/771,458, filed on Feb. 9, 2006.

(30) Foreign Application Priority Data
Feb. 9, 2006 (FI) .................................. 20065089

(51) Int. Cl.
*A22C 11/00* (2006.01)

(52) U.S. Cl. ............................................. 452/21

(58) Field of Classification Search ............... 452/21, 452/23–25, 27–28, 30–32, 35–37, 46–48, 452/51
See application file for complete search history.

(56) References Cited

U.S. PATENT DOCUMENTS

| | | | |
|---|---|---|---|
| 2,922,186 A * | 1/1960 | Sartore | 452/35 |
| 3,726,059 A * | 4/1973 | Cherio et al. | 53/64 |
| 4,396,039 A | 8/1983 | Klenk et al. | |
| 4,734,956 A * | 4/1988 | Frey et al. | 138/118.1 |
| 5,024,041 A * | 6/1991 | Urban et al. | 53/449 |
| 5,980,374 A * | 11/1999 | Mercuri | 452/21 |
| 6,200,613 B1 | 3/2001 | Schäfer et al. | |
| 7,051,415 B2 * | 5/2006 | Pinto et al. | 29/455.1 |
| 7,063,610 B2 * | 6/2006 | Mysker | 452/30 |
| 2005/0032470 A1 * | 2/2005 | Lopez | 452/35 |
| 2005/0129813 A1 | 6/2005 | Koenig et al. | |
| 2005/0163893 A1 | 7/2005 | Mintz | |

FOREIGN PATENT DOCUMENTS

| | | |
|---|---|---|
| EP | 0 986 957 A1 | 3/2000 |
| FI | 75474 C | 7/1984 |
| FI | 20040681 A | 11/2005 |
| WO | WO-95/30334 A1 | 11/1995 |
| WO | WO-2005/110104 A1 | 11/2005 |
| WO | WO-2007/039670 A1 | 4/2007 |

* cited by examiner

*Primary Examiner* — Richard Price, Jr.
(74) *Attorney, Agent, or Firm* — Fish & Richardson P.C.

(57) ABSTRACT

The invention relates to a process for producing a composite casing shirred to a caterpillar, said process comprising steps of pulling an outer casing over the inner casing, and optionally a net between the inner and outer casings, or over the outer casing, and finally shirring the composite casing thus obtained to give a compact tube, which is cut to yield caterpillars.

20 Claims, 3 Drawing Sheets

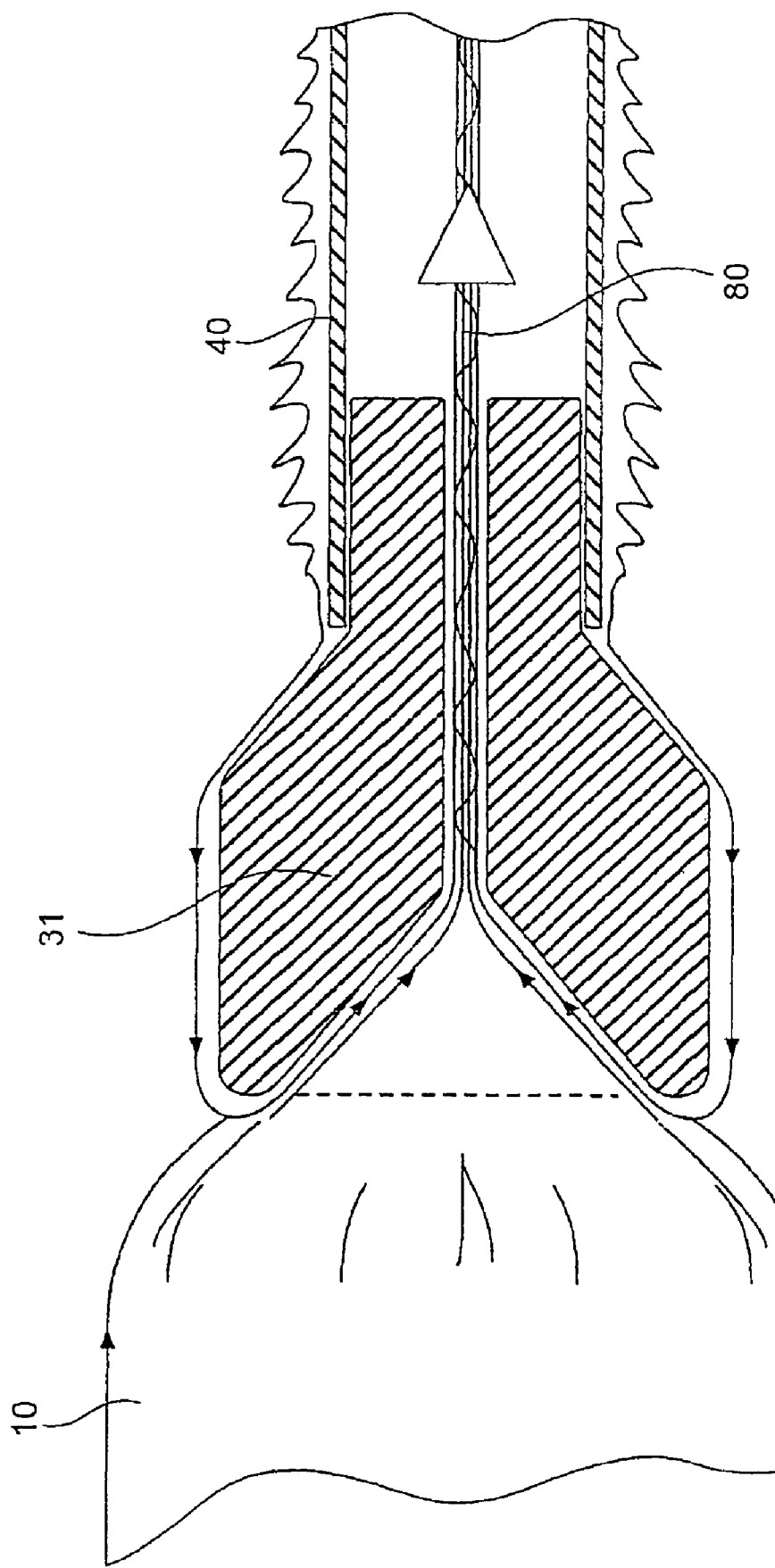

PROCESS FOR PRODUCING A COMPOSITE FOOD CASING

FIELD OF THE INVENTION

The invention relates to a process for producing a tubular food casing, wherein at least two tubular casings or skins, and optionally a net are joined without an adhesive or binding components to give a finished shirred compact stick, or a caterpillar, as such ready for use in the production of food products such as meat, fish, poultry, dairy, and vegetable products. In the process, for instance an absorbent and permeable casing, such as a fibrous casing may be combined with a barrier casing poorly permeable or impermeable to gasses, smoke, water vapour and humidity, and optionally with a net.

STATE OF THE ART

The purpose of food casings used for scalding and cooking meat, fish, poultry, vegetable and cheese products is primarily to protect the unfinished food product against external contamination, and to prevent weight losses during the production and storage. Cellulose based fibrous casings are widely used as food casings, such as sausage casings, since they allow for a convenient impregnation with e.g. flavouring and colouring agents, smoking and easy peeling from the surface of the food product. However, due to significant permeability to gasses, water vapour, and humidity of fibrous casings based on cellulose, weight losses of food products stuffed therein are high during storage and cooking, resulting in spoilage of the food product due to evident contamination risk.

To avoid such problems, food casings particularly for producing scalded and cooked food products, such as scalded sausages, are mainly impermeable plastic casings with multiple layers. While previously also fibrous casings coated with PVDC have been used, the popularity of such casings is decreasing since the use of PVDC is considered problematic due to hazardous wastes produced.

It is also possible to join flat polymeric films by seaming on tubular fibrous casings. Dimensional accuracy of the food casings thus produced varies considerably, thus giving rise to problems during production processes of food products.

Several prior art composite casings are known, wherein the object is to combine an inner casing imparting flavouring and colouring agents to the product, with a protecting impermeable casing, or layer. The publication EP 0 986 957 discloses a multilayer food casing consisting of an inner additive layer, and an outer impermeable layer. The inner layer applied on the inner surface of the outer polymeric casing comprises flavours and colours, etc, a binder such as polysaccharide or protein, and cross-linking agent, whereas the outer layer comprises a thermoplastic polymer insoluble in water, such as polyolefin, polyamide and/or polyester.

U.S. Pat. No. 6,200,613 discloses a casing for food products, comprising at least one film impermeable to vapour and/or gasses, joined to an absorbing and impregnated inner layer by lamination, typically by means of a glue, said inner layer containing fibres, woven fabric, fabric, knitting and fleece. The impermeable film is preferably attached with an adhesive to the inner layer. Said food casing is produced by first extruding a flat impermeable layer e.g. from polyethylene, the absorbing inner layer being then applied on the inside thereof, followed by spraying the desired flavour or colour on the absorbing inner layer, or immersion of the whole film into a bath. Finally, the finished food casing is seamed to the desired shape using heat. Such thermally seamed laminated tubular food casings may delaminate during the production and cooking of the food product.

A tubular bi-layer "tandem casing" is described in the application US 2005/0129813. The food casing comprises an inner casing, and an outer casing of thermoplastic polymer, having a single or multiple layers(s), poorly permeable to water vapour, oxygen and flavours. Particularly preferable outer casings include polyamide and polyolefin casings, multilayer casings being, however, also suitable. The inner casing may be a casing based on regenerated cellulose, thermoplastic starch and starch derivatives, polyurethane, paper, textile fibres, or a non-woven material, allowing for the impregnation with sufficient amounts of desired flavouring agents or the like. Said tandem casing is produced by first shirring both casings separately to give sticks, or caterpillars, followed by aligning said sticks one after another, pulling one end of the inner casing through the shirred outer casing and fixing to the other end thereof, followed by wrapping the shirred and aligned sticks in a film, ready for use for packaging food products. The composite casing or "tandem casing" is formed only associated with the manufacture or stuffing of the casing.

Prior art processes for applying nets on food casings are also known. In many processes, the net is applied on the casing only during stuffing of the casings and production of the food products, and to this end, a separately shirred tubular net and a separately shirred carrier casings are used. Length of the shirred casing will cause problems in case the shirred casing and shined net are aligned on the same stuffing horn. U.S. Pat. No. 5,024,041 discloses a device for stuffing a tubular casing with a sausage product, wherein a shirred carrier casing is directly arranged on a stuffing horn, whereas a shirred tubular net is arranged on a separate outer horn surrounding the stuffing horn. During stuffing, separately supplied shirred carrier casing, and net will become superimposed.

In case of a solution where a shirred net is pulled over a shirred carrier casing, an elastic net having an inner diameter larger than the outer diameter of the shined carrier casing should be used.

On the basis of the above teachings, it may be seen that there is an obvious need for an improved process for producing a composite skin at least consisting of at least two casings and optionally a net, said composite skin being shirred to give a finished stick or caterpillar ready for use as such to be directly stuffed with a food mass, for instance a composite skin consisting of an absorbent casing, and a casing poorly permeable or impermeable to oxygen, water vapour and flavours, and optionally a net.

OBJECT OF THE INVENTION

An object of the invention is a process for producing a tubular composite skin or casing, shirred to a compact stick (caterpillar), suitable for food products, said composite skin or casing comprising at least two casings and optionally a net either between the casings, or as the outer layer thereon, said food casing being suitable as such for the production of food products.

Another object of the invention is a process for producing a composite casing or skin, shirred to a compact caterpillar, said casing comprising at least one absorbing and/or permeable casing, and at least one barrier casing, poorly permeable or impermeable to oxygen, water vapour and flavours, and optionally a net either between the casings, or as the outer layer thereon, said food casing being suitable as such for the production of food products.

Another object of the invention is a process for producing a tubular composite skin or casing, shirred to a compact stick (caterpillar), comprising at least two casings and optionally a net either between the casings, or as the outer layer thereon, and where the inner casing comprises an impregnated cellulose based casing and the outer casing comprises a barrier casing, and said composite casing being suitable as such for the production of food products.

Still another object of the invention is to provide a composite casing comprising at least two layers, produced by the process of the invention.

Characteristic features of the process and the composite casing or skin of the invention are presented in the Claims.

A casing refers here to tubular skins and casings used for the manufacture of foodstuffs, such as sausages, cheese products, fish products, vegetable products and the like.

Caterpillar refers here to a shirred compact tubular stick or rod formed of a long shined tubular article such as food casing or skin.

SUMMARY OF THE INVENTION

The invention is directed to a process for producing a shined and tubular composite casing, wherein at least two tubular skins or casings, and optionally a net are joined without any adhesive or binding components to give a finished shirred compact stick, or a caterpillar, ready for use as such in the production of food products, e.g. meat, fish, poultry, cheese, cheese-like products and vegetable products, particularly for the production of scalded sausages. With the process, at least two tubular casings may be combined (joined), said casings being seamless films, or films seamed to give tubes.

In the method an absorbing and permeable casing such as fibrous casing may be combined (joined) with for instance a barrier casing poorly permeable or impermeable to gasses, smoke, water vapour, oxygen, and flavours, and optionally with a net. In the process, if necessary also two or more absorbing and permeable casings, or two or more barrier casings may also be combined. A tubular net may also be optionally combined with the casings to be joined, either between or on the casings as the outer layer. The production is carried out without an adhesive or binding components. The invention is also directed to the product produced with the process.

FIGURES

Appended FIG. 1 shows an embodiment of the process of the invention carried out without a net.

FIG. 3 shows as magnified the joining of the inner casing and the barrier casing at the pleating head.

Figure 1:
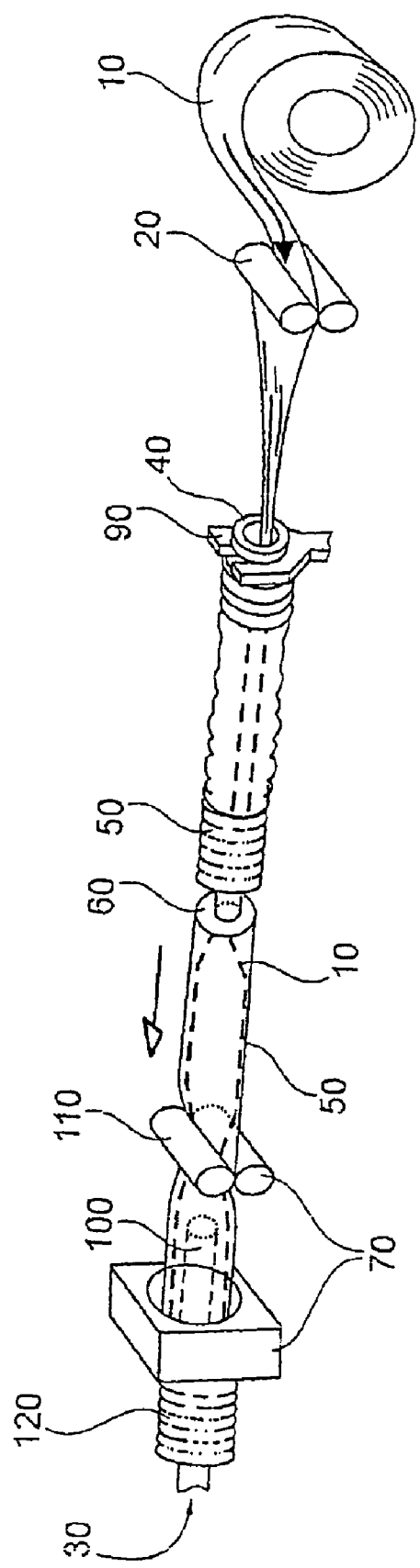

In FIG. 1, a pre-treated tubular inner casing (fibrous casing) 10 on a roll is reeled off and pulled via the feeding cylinders 20 of the inner casing and through the pipe 40 by introducing into the open end thereof, said pipe 40 being fixed with a holding means 90. A pre-treated outer casing, here the barrier casing 50, shirred, or arranged as a pre-shirred stick (caterpillar) on the pipe 40, is pulled over a calibre disc 60 on the opposite end of the pipe 40, followed by pulling both casings, that is, the inner casing 10 and the barrier casing 50, on the shirring horn 100. The inner casing 10 is inflated open with an air stream (or another inert gas) 30 to give a pressurized tube having a circular cross-section in the area between the calibre disc 60 and a pair of compressing/feeding cylinders 110 of the shirring machine 70. It is preferable that enough composite casing is supplied with said feeding cylinders 110 to avoid winding of the finished composite casing. The pressure of the air blown from inside the shirring horn 100 of the shirring machine 70 inflates and bulges the inner casing in the barrier casing 50. Finally the food casing 120 covered by the barrier casing is shined with the machine to give a compact stick, which is cut by a cutter to desired lengths.

Figure 2:
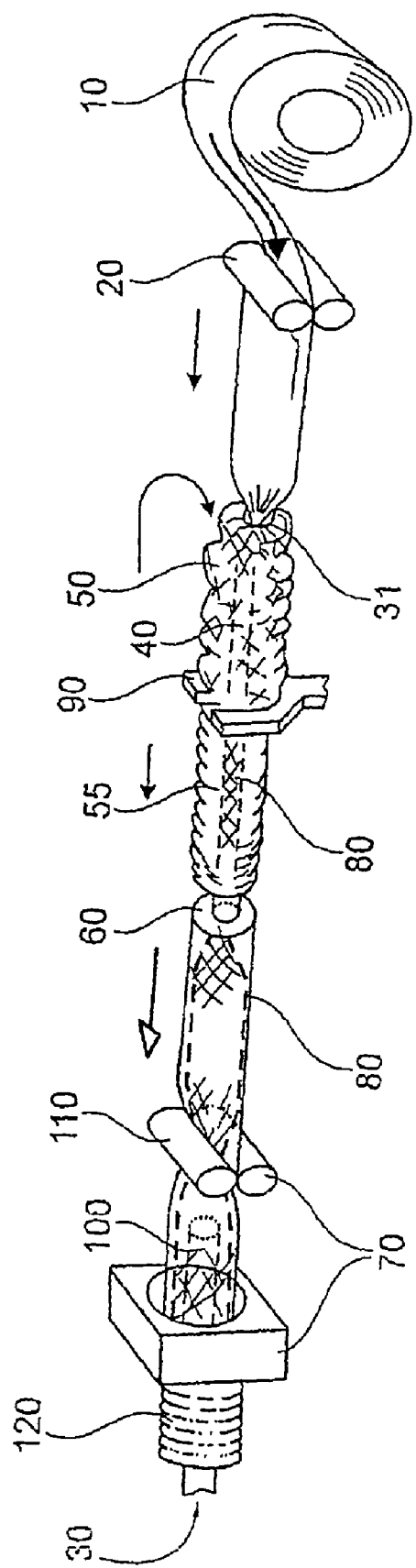
FIG. 2 shows another embodiment of the invention for producing a combination of an inner casing, a barrier casing, and a net.

In FIG. 2, a pre-treated tubular inner casing 10 on a roll is reeled off and pulled via the feeding cylinders 20 of the inner casing towards the pipe 40 having a shined tubular net 50 thereon, upstream of the holding device 90, followed by blowing air 30 or another inert gas into the inner casing 10 for inflating/pressurizing between the rolls 20 and the pipe 40 to give a tube having a circular cross-section, said air or gas being blown in the opposite direction relative to the travelling of the casing 10. Then, said inflated/pressurized inner casing 10 is passed towards a pleating head 31 attached to the pipe 40. The pipe 40 is centrally fixed with a holding device 90, and coaxially arranged with the shirring horn 100. A separately sized pleating head 31 is specifically selected for each net quality/calibre range, said pleating head having a conical constrictor formed thereon, the angle thereof being 5 to 89°, preferably 15 to 50°, said constrictor having a duct preferably of the size matching with the cross-section of the constricted net/casing combination. The diameter of the duct is from 4 to 30 mm, preferably from 8 to 15 mm. The inner casing 10 inflated/pressurized to have a circular cross-section is then uniformly and evenly pleated into the pipe 40, while pulling the net 50 turning inside out over itself. The combination 80 formed of the net and the inner casing is conveyed by means of the feeding/compressing cylinders (rolls) 110 of the shirring machine 70 through the pipe 40. The inner casing covered by the net 80 exits the pipe 40 as a rope-like narrow tube or ribbon. The pre-treated barrier casing 55, which is shined and arranged on the other end of the pipe 40, downstream of the holding means 90, or a barrier casing correspondingly pre-shirred to give a caterpillar, is pulled over the calibre disc 60 at the end of the pipe 40, through the feeding/compressing cylinders 110, and further, over the inner casing covered by the net 80, and finally conveyed on the shirring horn 100. The inner casing covered by the net 80 is inflated with air 30 to give a pressurized tube having a circular cross-section in the area between the calibre disc 60 and the feeding cylinders 110. It is preferable that enough net/casing combination 80 is supplied with said feeding cylinders 110 to avoid winding or bending of the finished casing. Finally, the composite casing 120 consisting of the barrier casing, the net and the inner casing is shirred by the shirring machine 70 to give a compact stick, which is cut by a cutter to desired lengths.

FIG. 3 shows as magnified the joining of the inner casing and the barrier casing at the pleating head. The inflated/pressurized inner casing 10 is conveyed/pulled towards the pleating head 31, which is attached to the pipe 40. Simultaneously shined net or outer casing on pipe 40 is turned inside out on the inner casing and a ribbon like pleated combination 80 is formed, which is conveyed/pulled towards the shirring machine.

DETAILED DESCRIPTION OF THE INVENTION

It has been surprisingly found that two or more tubular casings or skins may be combined (joined) in a controlled manner without any adhesive or adhesive components to yield a shined stick or rod. Also a tubular net may be arranged between or on the casings to be combined, in the latter case the net being the outermost layer. Also a casing or skin may replace the net. For instance an absorbing and permeable casing may be joined in a controlled manner with a barrier casing, and optionally with a tubular net to give a finished shirred composite casing comprising at least two casings preferably in the form of a shined stick, as such ready for use in the production of food products.

According to the invention, suitable inner casings, which will be in direct contact with the food product manufactured, include casings or skins in the form of a seamed or seamless tubular films, such as casings and skins based on synthetic or natural materials acceptable for food applications. A seamless tubular film is preferably used. Suitable casings include those based on collagen, regenerated or modified cellulose such as fibre-reinforced casings, and further, casings based on thermoplastic starch and/or thermoplastic starch derivatives and other suitable polymers like polyurethanes, and paper, textile fibres or non-woven materials, or combinations thereof. Moreover, the inner casing may comprise paper impregnated with alginate, made into a tubular form by seaming. Also, single layer or multilayer plastic casings based on polyamide, polyolefin, polyester, poly(vinylidene chloride), poly(vinyl chloride), polystyrene, EVOH, EVA, EMA, EEA, block copolymers of polyethers and polyamides or the like, and combinations thereof, manufactured according to methods known in the art, may also be used as the inner casing. Casings based on polyamide and/or polyolefin are preferable plastic casings. Known thermoplastic casings permeable to smoke are also suitable, casings based on mixtures of block copolymers of polyethers and polyamides with polyamides being preferable.

In case the purpose of the inner casing is to deliver aroma, flavouring and colouring agents to the product, an absorbing casing is preferably used as the inner casing. Preferably fibre-reinforced casing based on regenerated cellulose is used, for instance paper, sisal or hemp reinforced casings, manufactured for instance with viscose processes known in the art. In the viscose process viscose or soluble cellulose derivative is extruded as a tubular film through a circular nozzle to coagulating and regenerating baths, whereby a tube of regenerated cellulose is obtained, which is then washed, plastisized with water and/or polyol such as glycerine and dried. The casing may be un-reinforced or reinforced with fibres.

Wall thickness of the inner casing varies according to the materials, said wall thickness being typically from 30 to 200 µm. In certain embodiments it is preferable that the inner casing has improved adhesion properties. This may be achieved during the manufacture of fibre-reinforced casing based on cellulose using the bubble method between the plastisizing bath and the drier, well known in the field, thus impregnating the inner surface of the casing by an agent improving adhesion. The adhesion property may be enhanced with several different agents. Particularly preferable adhesion improving agents are cationic polyamide epichlorohydrin resins, the dry matter of an aqueous impregnation solution being thus preferably 0.001-1%, preferably 0.004-0.04% by weight.

If desired, the inner casing, optionally subjected to the above described treatment during the manufacture to improve the adhesion properties, is pre-treated before the combination/joining process, for instance by moisturing or impregnating by known procedures such as by spraying, or immersion of the casing into an impregnating liquid or impregnation the casing from the inner side by the so-called bubble method. One or more substances commonly known in the art selected from the group consisting of flavouring, aroma, liquid smoke, seasoning, colouring, and herbal agents and flavour enhancers or mixtures thereof in a suitable carrier, preferably an aqueous carrier, in combination with additives and binders known in the art may be used for the impregnation of the inner casing. Colouring agents may comprise solutions, dispersions or emulsions of turmeric, carmines, caramels, carotenoids, beta-carotein, annatto, bixine, norbixine, sweet pepper extracts, capsantine, capsorubicine, beetroot colour, betalaine, betaine and combinations thereof. Flavouring, aroma and seasoning agents may comprise basic, neutral and acidic liquid smokes. Flavouring, aroma and seasoning agents may also comprise solutions, dispersions and emulsions of peppers, such as cayenne pepper, chilli pepper, black pepper, lemon pepper, Jamaica pepper, white pepper, green pepper, ginger, cumin, cheese cumin, coriander, sweet pepper, mustard seed, mustard, onion, garlic, aroma flavor, broiler seasoning, Cajun, curry, grill seasoning, chicken broth, chicken seasoning, beef stock, pork seasoning, roasted beef and broiler seasoning and combinations thereof. Herbal agents may comprise solutions, dispersions and emulsions of basil, chervil, rabbet, oregano, parsley, dragoon, rosemary, chives, dill, thyme and combinations thereof. Preferably the absorbing inner casing is impregnated with a solution comprising one or more agents selected from flavouring, aroma, seasoning and colouring agents.

Casings or skins in the form of tubular, preferably seamless tubes, including casings and skins based on synthetic or natural materials, acceptable for food product applications, are suitable outer or external casings in the process of the invention. Suitable casings include plastic casings comprising one or more layers, produced in the known manner, based on e.g. polyamide, polyolefin, polyester, poly(vinylidene chloride), poly(vinyl chloride), polystyrene, EVOH, EVA, EMA, EEA, block copolymers of polyethers and polyamides or the like, or combinations thereof. Casings based on polyamide and/or polyolefin are preferable plastic casings.

Known thermoplastic casings permeable to smoke are also suitable, and casings based on mixtures of block copolymers of polyethers and polyamides with polyamides being preferable. A preferable thermoplastic casing is bi-axially stretch oriented and it comprises 15-85%, preferably 50-70% by weight of polyamide (i) or a combination of polyamides (i) selected from PA6 and PA 6/66 and 15-85%, preferably 30-50% by weight of hydrophilic block copolymer (ii) or a combination of polymers (ii) comprising polyamide PA6 blocks and polyethylene glycol (PEG) blocks, the casing having moisture vapour transmission rate (MVTR) of more than 100 g/m$^2$/24 h, preferably more than 250 g/m$^2$/24 h.

It is also possible to use casings based on collagen, regenerated or modified cellulose, such as fibre-reinforced casings, and further, casings based on thermoplastic starch and/or thermoplastic starch derivatives and other suitable polymers like polyurethanes, paper, textile fibres or non-woven materials, or casings comprising paper impregnated with alginate, and made tubular by seaming, or combinations thereof.

In case the purpose of the outer or external casing is to function as an impermeable layer, the outer casing is preferably a barrier casing, that is, a casing poorly permeable or impermeable to oxygen, water vapour, and flavours, selected from the group consisting of single or multilayer casings comprising a thermoplastic polymer. Suitable barrier casings include known multilayer casings, also comprising a thermoplastic polymer, having at least two, preferably five layers, the outer layer comprising polyamides, the intermediate layer comprising polyethylene and the inner layer comprising polyamide, and further, adhesive layers being present between said outer, intermediate and the inner layers for binding. Preferable impermeable plastic casings comprise casings based on polyamide and/or polyolefin having moisture vapour transmission rate of 4-50 g/m$^2$/24 h, preferably 4-14 g/m$^2$/24 h.

The outer or topmost casing may also be selected on purpose as more permeable to water vapour, whereby a monolayer casing based on thermoplastic polymer may be used. Preferable plastic casings for this purpose are casings based on polyamides, having moisture vapour transmission rate of 300-600 g/m$^2$/24 h, preferably 400-500 g/m$^2$/24 h.

In the case a cellulose based fibrous casing is used as the outer casing, and a barrier casing or a thermoplastic polymer casing permeable to smoke serves as the inner casing, visual appearance characteristic of fibrous casings is obtained, simultaneously with impermeability of the barrier casing or selective permeability of the thermoplastic polymer casing.

Wall thickness of the outer casing varies according to materials, said wall thickness being typically from 25 to 200 μm.

If desired, also the outer casing may be pre-treated, for instance moisturized with water, liquid smoke, or another liquid containing flavouring or seasoning agents in a soluble form. This pre-treatment is preferably carried out, when cellulose based fibrous casings are used as the outer casing and a thermoplastic casing permeable to smoke serves as the inner casing.

The process according to the invention for producing the composite casing comprises steps where an inner casing is pulled through a pipe having a calibre disc at the exit end of the inner casing and having a shined outer casing arranged thereon, while simultaneously pulling the outer casing over the calibre disc in the travelling direction of the casing, and further over the inner casing pressurized and inHated with air or gas to have a tubular form, followed by pulling the combination of the outer and inner casings onto the shirring horn by means of the feeding cylinders (rolls) of the shirring machine, said shirring machine shirring the composite casing to give a compact rod or stick, which is cut to desired lengths or caterpillars.

According to another embodiment of the process of the invention, the pipe also comprises a shined tubular net (or optionally a tubular casing to be arranged between the outer casing and the inner casing) in the travelling direction of the inner casing, and at the other end of the pipe a shined outer casing, or alternatively vice versa, said net and the outer casing being separated from each other by a holding means or an adapter, and then air or gas is blown into the inner casing through the shirring horn, thus pressurizing and inflating the inner casing to give a tube in the area between the feeding cylinders and the opening of the pipe, followed by passing to the pleating head attached to the pipe and holding the net, the inner casing being then pleated into the pipe while pulling the net turning inside out over itself, thus forming a combination of the inner casing and the net, said combination being pulled through the pipe, followed by pulling the outer casing over the combination as described in the previous embodiment. A product having an external net is obtained by reversing the order of the net and the outer casing arranged on the pipe. A tubular casing may be used instead of the net too.

To provide sufficient elasticity and resistance, the (shined) inner and outer casings and the net are moistened if necessary with liquid, such as water prior to the production of composite casing.

The calibre disc may have any form, however, a circular calibre disc is preferably used, the diameter of the disc being selected according to the flat width of the casing and in practice according to the minimum flat width of the outer casing to allow for an easy passage of the casing over the calibre disc. The calibre disc is arranged on the end of the first pipe (40 in Figures) closer to the shirring machine. The pleating head is arranged on the opposite end of the first pipe, that is, on the end where the inner casing is reeled off.

Air or another inert gas is blown into the optionally pretreated inner casing in the opposite direction relative to the movement thereof through the shirring horn to provide the inner casing with an inflated/pressurized section in the area between the calibre disc and the feeding cylinders of the shirring machine, and in case a tubular net or another casing is arranged by pulling between the outer and inner casings, an inflated/pressurized section is also formed between the first feeding cylinders and the pleating head. The pressure may be adjusted as desired by the feeding cylinders of the shirring machine and first feeding cylinders, as well as by the blowing air/gas. Any inert gas may be used for opening the inner casing and shirring in the shirring machine, air being preferable.

At the shirring machine, the inner casing or the combination of the inner casing and the net is inflated and conveyed into the outer casing by the pressure of the air or an inert gas blown from inside the shirring horn, the machine finally shining the composite casing to give a compact caterpillar. If necessary, moisture may be added to the casing also during the shining.

In the process of the invention, the inner casing may be reeled on a roll or in the form of a straight flat tube, or in any other suitable form.

The outer casing is pulled over the pipe (40 in the Figures), for instance a steel pipe, and fastened at the open end thereof, approached by the inner coating, by a holding means for aligning the barrier casing with the shirring horn of the shining machine.

In case a tubular net is used, a pleating head is fixed to one end of the tubular net specifically sized for each calibre range/casing grade used, said pleating head comprising a constricting means, a pipe attached thereto, and a rear portion enabling the attachment of the net to said pleating head. Moreover, a conical constrictor is formed to the pleating head, said constrictor having an angle of 5° to 89°, preferably 15° to 50°, further having a duct, the size of which preferably matches the cross-section of the constricted casing combination. The diameter of the duct is 4 to 30 mm, preferably 8 to 15 mm. Diameter of the pleating head is preferably larger than that of the barrier casing. For instance for a casing having a diameter of 33.9 mm, a pleating head having an outer diameter of 46 mm is used. The purpose of the pleating head is to open the barrier casing in a controlled manner, to uniformly constrict and pleat the inflated inner casing to give a pleated rope or ribbon, and finally, to orient the casings together. Casings described for outer and inner casings may also be used instead of the tubular net.

Diameter/calibre of the inner casing is of the same magnitude or smaller, preferably smaller than that of the outer casing and the net, in case the net is arranged between the casings. The calibre of the net is of the same magnitude or larger, preferably larger than that of the casings in case of an external net.

The net or a net cover comprises a net stocking and preferably a seamless net stocking or tube comprising meshes or holes. The net may be produced or knitting using any known net production method, preferably a knitting method for producing nets with meshes. All known knitting methods suitable for knitting nets are particularly preferable. The net comprises meshes having polygonal such as rhombic, square, triangular, hexagonal, octagonal, decagonal and dodecagonal forms, or circular or oval meshes.

The material of the net may be any fibre of food quality. Suitable fibres include cotton, linen, viscose, polyamide, polyester, polyolefin, for instance polyethylene, and cellulose. If desired, the net may be endowed with elasticity using elastane, for instance elastane fibres.

The net may be produced from single fibres or from several fibres wound together according to the application, and according to the height of the bulges to be provided on the surface of the product like high bulges, low bulges or no bulges at all. Suitable combinations include combinations of cotton, polyethylene and elastam, and the combination of cotton and polyethylene. The net may also contain coloured fibres, dyed preferably with any food grade dyes.

The purpose of net coverings on food products, such as sausages is primarily to provide an aesthetic appearance, such as a rustic impression. Decorative e.g. wavy (ginger bread) patterns may be provided on outer edges of the slices when a sausage product having a covering net is sliced.

Known apparatuses of the prior art suitable for the process of the invention may be used. Shirring machines known in the art may be used, and further, shirring techniques known for shirring machines may be applied in the process. A cutter of the rotating saw type preferably serves as the cutter.

In the process of the invention, identical or different food casings, and optionally a net may be combined in a controlled manner utilising pressure, followed byshirring of the composite casing thus obtained to give a compact stick. The pleats keep the casings together whereby no mechanical binding for example using adhesives to them together is needed. If desired, an absorbing permeable casing, such as a fibrous casing made of regenerated cellulose may be used as the inner casing, and an impermeable barrier casing such as a plastic casing serves as the outer casing, and the impregnated/moistened fibrous casing is thus kept under hygienic conditions inside the plastic casing for the production of the food product, and accordingly, the inner casing, e.g. the fibrous casing is not dried during storage, said drying being a common problem for instance for fibrous casings. In failure situations possibly occurring during the manufacture of food products, where the process is disrupted, the moistened absorbing casing inside the outer casing is not dried but keeps flexible and suitable for use for long periods of time. After production and cooking of the food product the casing may be removed completely. Often liquid (meat liquid) and fat remains between the casing and the food product, such as sausage, the formation of which in the products is considered undesirable and additionally un-aesthetic. This problem occurs particularly in connection with scalded sausages, where the weight losses are big. This is why adhesion improvers are used in scalded sausage products at high concentrations. It is now surprising that when an adhesion improver is used on the inner side of the inner casing, particularly cationic epichlorohydrine resin at very low concentrations, the formation and ablation of fat and meat liquid from the product is decreased, resulting in smaller weight losses. This increases the weight of skinless products, because fat and meat liquid remain in the product and do not leak out from the product when peeled. Additionally, the retaining of fat and meat liquid increase the hygienic level of the product because there is no danger of microbes and particularly moulds starting to grow in the liquid or fat between the casing and the product.

After production and cooking of the food product, also the outer plastic casing may be removed, if desired. High weight losses during cooking and storage are undesired for many food products such as sausages, said outer plastic casings effectively preventing such weight losses. On the other hand, cooling and tempering of the products is more efficient in fibrous casings, with the plastic removed, the product being then quickly ready for slicing and final packaging. Moreover, fibrous casings have remarkably better adhesion properties when compared to plastic casings.

The product according to the invention is a composite casing shirred to the form of a caterpillar (rod), consisting of an inner casing, outer casing and optionally a net, combined with each other without adhesives or additives, the combination being further shirred.

It was surprisingly found that the shirred composite casing suitable for food product applications, produced with the process of the invention, is a stable combination resisting separation of the inner and outer casings and the optional net during the production, cooking and storage of the food product. The product is thus not associated with any delamination problem, and moreover, the dimensional stability thereof is excellent since the calibre is determined by the dimensionally accurate fibrous casing.

In the process of the invention, no problems are caused by the variation of flat dimensions as opposed to processes where shirred sticks made of seamed films are aligned one after another, especially in cases where the seaming is less than perfect.

The process of the invention allows for the production of composite casings of any different sizes, each casing having the desired diameter/calibre. The calibre of the casing may be easily changed, and further, the process is cost-effective.

The length of the shirred stick may be freely selected according to wishes of the respective final user, that it, the food producer. Shirred composite casings of the invention may be stuffed with food emulsion like sausage mass using commonly known packing and stuffing tools.

Composite casings shirred to user-friendly sticks, immediately ready for use, are thus obtained, said composite casings being suitable for any conventional stuffing machine. Less raw materials are needed in the process of the invention compared with casings produced using adhesives.

If desired, the composite casings produced by the process of the invention may be directly used without prior soaking or moisturising by the food producer, but it may, however, be also soaked or moisturised in the same manner as ordinary corresponding casings prior to stuffing, particularly if the moisture content of the product is adjusted to a low level.

The invention is illustrated with the following examples, however the intension is not to limit the invention to the examples only.

EXAMPLE 1

A composite casing was manufactured according to the method described in FIG. 1, where three fibre-reinforced casings based on regenerated cellulose were impregnated with a solution comprising liquid smoke and caramel colour. The solution contained 16.9% of liquid smoke and 43.9%, by weight, totally. The casings used were as follows:
  a) Inner casing without adhesion improver
  b) Inner casing with slight improvement in adhesion
  c) Inner casing with more improvement in adhesion than in b)

Adhesion improvement of inner casing was carried out in connection with the manufacture of the casing using aqueous cationic polyamide epichlorohydrin resin solution having solid content in b) 0.006% and in c) 0.02% by weight.

In the process the above, impregnated fibrous casings were combined with fivelayer plastic casing, and the combinations were shirred and cut to sticks. The desired compact sticks were obtained, ready for the manufacture of sausages.

Macerated ham mass having meat content of 90% by weigh was injected to the shirred composite casings such that the filling calibre of all casings was in the range of 93.0-93.5. The hams were cooked with same program to 72° C. inside temperature. Hams were cooled and peeled on the following day. In connection with peeling the surface colour, smell and the amount of released fat and meat liquid were evaluated.

The surface colour and smell of hams manufactured in all three casings were considered good. The results are presented in the following table 1. No visually detectable differences were found in the products. The amount of released fat and meat liquid was evaluated using a 5-step scale (1-5) such that five (5) meant that there was no fat or meat liquid released and one (1) meant that a lot of fat or meat liquid was released.

TABLE 1

| Results (ham product) | | |
|---|---|---|
| Sample | Released fat | Released meat liquid |
| A | 4 | 1 |
| B | 5 | 3 |
| C | 5 | 4 |

The results show that rods particularly suitable for the manufacture of food products may be manufactured according to the method according to the invention and additionally the use of adhesion improver influences the final product. Already, inner casings treated with very dilute aqueous solutions of cationic polyamide epichlorohydrin resins decrease significantly the amount of released meat liquid in ham products.

EXAMPLE 2

Composite casing was manufactured with the method described in FIG. 1, where three different fibre-reinforced casings based on regenerated cellulose, of calibre 85 mm, were first impregnated with a solution comprising liquid smoke and caramel colour. The solution contained 16.9% of liquid smoke and 43.9%, by weight, totally. The casings used were as follows:
a) Inner casing without adhesion improver
b) Inner casing with slight improvement in adhesion
c) Inner casing with more improvement in adhesion than in b)

Adhesion improvement of inner casing was carried out in connection with the manufacture of the casing using aqueous cationic polyamide epichlorohydrin resin solution having solid content in b) 0.006% and in c) 0.02% by weight.

In the process the above, impregnated fibrous casings were combined with fivelayer plastic casing, the combinations were shirred and cut to sticks. The desired compact sticks were obtained, ready for the manufacture of sausages.

Rough structured cooked salami mass having fat content of 30% by weigh was injected to the shirred casings. The filling calibre of all casings was in the range of 93.0-93.5. The sausages were cooked with same program to 72° C. inside temperature, followed by cooling and peeling on the same day. In connection with peeling the surface colour and smell of the sausages and the amount of released fat and meat liquid were evaluated visually.

The surface colour and smell of sausages manufactured in all three casings were considered good. No visually detectable differences could be observed. The amount of released fat and meat liquid was evaluated using a 5-step scale (1-5) as described in example 1. The results are presented in the following table 2.

TABLE 2

| Results (cooked salami) | | |
|---|---|---|
| Sample | Released fat | Released meat liquid |
| a | 2 | 3 |
| b | 4 | 4 |
| c | 5 | 4 |

The results show that rods particularly suitable for the manufacture of food products may be manufactured according to the method according to the invention and additionally the use of adhesion improver influences the final product. Already, inner casings treated with very dilute aqueous solutions of cationic polyamide epichlorohydrin resins decrease significantly the amount of released meat liquid in cooked salami products.

The invention claimed is:

1. A process for producing a shirred tubular composite casing, characterized in that the process comprises steps where an inner casing is pulled through a pipe having a calibre disc at the exit end of the inner casing and having a shirred outer casing arranged thereon, while simultaneously pulling the outer casing over the calibre disc in the travelling direction of the casing, and further over the inner casing opened to have a tubular form and pressurized, followed by pulling the combination of the outer and inner casings onto a shirring horn using feeding cylinders of a shirring machine, said shirring machine shirring the composite casing to give a compact tube, which is cut to sticks of desired lengths.

2. The process according to claim 1, characterized in that there is a shirred tubular net on a first end of the pipe in the travelling direction of the inner casing and a shirred outer casing on the second end of the pipe, said net and outer casing being separated from each other by a holding device or an adapter, and the inner casing is pressurized and inflated to have a tubular form in an area between the feeding cylinders of the inner casing and the opening of the pipe, and then passed to a pleating head attached to the pipe and holding the net, followed by pleating the inner casing into the pipe while pulling the net, turning inside out over the same, thus forming a combination of the inner casing with the net, said combination being pulled through the pipe.

3. The process according to claim 2, characterized in that said net is a seamless net stocking or a tube comprising meshes with polygonal, circular or oval forms.

4. The process according to claim 2, characterized in that said net comprises fibres selected from the group consisting of cotton, linen, viscose, polyamide, polyester, polyolefin, cellulose and elastan.

5. The process according to claim 2, characterized in that said pleating head comprises a conical constrictor having an angle of 5° to 89°.

6. The process according to claim 2, characterized in that said pleating head comprises a duct having a diameter of 4 to 30 mm.

7. The process according to claim 2, characterized in that said pleating head comprises a conical constrictor having an angle of 15° to 50°.

8. The process according to claim 2, characterized in that said pleating head comprises a duct having a diameter of 8 to 15 mm.

9. The process according to claim 1, characterized in that said inner casing is a casing based on synthetic or natural material and suitable for food applications.

10. The process according to claim 1, characterized in that said outer casing is a casing based on synthetic or natural material and suitable for food applications.

11. The process according to claim 1, characterized in that said inner casing is a casing based on collagen, based on regenerated or modified cellulose, based on thermoplastic starch and/or thermoplastic starch derivatives, or polyurethanes, a casing based on paper, textile fibres, paper impregnated with alginate, non-woven materials, a plastic casing based on polyamide, polyolefin, polyester, poly(vinylidene chloride), poly(vinyl chloride), polystyrene, EVOH, EVA, EMA, EEA, block copolymers of polyethers and polyamides or a combination thereof, or the casing is a combination of the above.

12. The process according to claim 1, characterized in that said inner casing is a fibre-reinforced casing based on regenerated cellulose.

13. The process according to claim 12, characterized in that said inner casing is a casing reinforced with paper, sisal or hemp.

14. The process according to claim 1, characterized in that said inner casing is a fibre-reinforced casing based on regenerated cellulose, treated during manufacture of the casing with an aqueous solution of an adhesion improver containing 0.001-1% by weight of the adhesion improver.

15. The process according to claim 14, characterized in that said adhesion improver is cationic polyamide epichlorohydrin resin.

16. The process according to claim 15, characterized in that said aqueous solution of the adhesion improver contains 0.004-0.04% by weight of the cationic polyamide epichlorohydrin resin.

17. A composite casing shirred to the form of a stick, comprising at least two casings, one inner casing and one outer casing, the inner casing comprising a fibre-reinforced casing treated during the manufacture of the casing with an aqueous solution containing 0.001-1% weight of the adhesion improver, obtainable by the process according to claim 14.

18. The composite casing shined to the form of a stick according to claim 17, further comprising a tubular net.

19. The process according to claim 1, characterized in that said outer casing is a plastic casing based on polyamide, polyolefin, polyester, poly(vinylidene chloride), poly(vinyl chloride), polystyrene, EVOH, EVA, EMA, EEA, block copolymers of polyethers and polyamides, or a combination thereof, or further, the outer casing is based on collagen, or a casing based on regenerated or modified cellulose, thermoplastic starch and/or thermoplastic starch derivatives, or polyurethanes, or a casing based on paper, textile fibres, paper impregnated with alginate, or non-woven materials, or the casing is a combination thereof.

20. The process according to claim 1, characterized in that said outer casing is a multilayer casing comprising thermoplastic polymer, comprising at least two, preferably five layers, of which the outer layer comprises polyamide, the intermediate layer comprises polyethylene and the inner layers respectively comprises polyamide, adhesive layers being present between said layers for binding.

* * * * *

UNITED STATES PATENT AND TRADEMARK OFFICE
CERTIFICATE OF CORRECTION

| | |
|---|---|
| PATENT NO. | : 8,226,457 B2 |
| APPLICATION NO. | : 12/223187 |
| DATED | : July 24, 2012 |
| INVENTOR(S) | : Esa Hihnala |

It is certified that error appears in the above-identified patent and that said Letters Patent is hereby corrected as shown below:

In column 2, line 29, delete "shined" and insert -- shirred --, therefor.

In column 2, line 39, delete "shined" and insert -- shirred --, therefor.

In column 3, line 18, delete "shined" and insert -- shirred --, therefor.

In column 3, line 24, delete "shined" and insert -- shirred --, therefor.

In column 4, line 7, delete "shined" and insert -- shirred --, therefor.

In column 4, line 11, delete "shined" and insert -- shirred --, therefor.

In column 4, line 35, delete "shined" and insert -- shirred --, therefor.

In column 4, line 55, delete "shined" and insert -- shirred --, therefor.

In column 4, line 65, delete "shined" and insert -- shirred --, therefor.

In column 5, line 5, delete "shined" and insert -- shirred --, therefor.

In column 6, line 5, delete "norbixine," and insert -- norbixin, --, therefor.

In column 6, line 6, delete "capsantine," and insert -- capsanthin, --, therefor.

In column 6, line 6, delete "capsorubicine," and insert -- capsorubin, --, therefor.

In column 7, line 28, delete "shined" and insert -- shirred --, therefor.

In column 7, line 31, delete "inHated" and insert -- inflated --, therefor.

In column 7, line 39, delete "shined" and insert -- shirred --, therefor.

In column 7, line 42, delete "shined" and insert -- shirred --, therefor.

In column 7, line 58, delete "(shined)" and insert -- (shirred) --, therefor.

In column 8, lines 22-23, delete "shining" and insert -- shirring --, therefor.

In column 8, line 25, delete "shining." and insert -- shirring. --, therefor.

In column 8, lines 32-33, delete "shining" and insert -- shirring --, therefor.

In column 9, line 11, delete "elastam," and insert -- elastane, --, therefor.

In column 9, line 26, delete "byshirring" and insert -- by shirring --, therefor.

Signed and Sealed this
Sixteenth Day of October, 2012

David J. Kappos
*Director of the United States Patent and Trademark Office*

In column 9, lines 52-53, delete "epichlorohydrine" and insert -- epichlorohydrin --, therefor.

In column 10, line 65, delete "fivelayer" and insert -- five layer --, therefor.

In column 11, line 54, delete "fivelayer" and insert -- five layer --, therefor.

In column 12, line 55, claim 4, delete "elastan." and insert -- elastane. --, therefor.

In column 14, line 12, claim 18, delete "shined" and insert -- shirred --, therefor.